United States Patent
Titley et al.

(10) Patent No.: US 10,595,499 B2
(45) Date of Patent: Mar. 24, 2020

(54) CONDUIT AND METHOD OF USING THE SAME

(71) Applicant: Fullwood Limited, Ellesmere (GB)

(72) Inventors: Vernon Alan Titley, Ellesmere (GB); John Richard Baines, Ellesmere (GB)

(73) Assignee: Fullwood Limited, Ellesmere (GB)

( * ) Notice: Subject to any disclaimer, the term of this patent is extended or adjusted under 35 U.S.C. 154(b) by 103 days.

(21) Appl. No.: 15/279,209

(22) Filed: Sep. 28, 2016

(65) Prior Publication Data
US 2018/0000039 A1    Jan. 4, 2018

(30) Foreign Application Priority Data
Jun. 30, 2016    (GB) ..................................... 1611491

(51) Int. Cl.
*A01J 5/04*    (2006.01)
*A01J 5/08*    (2006.01)

(52) U.S. Cl.
CPC ............... *A01J 5/044* (2013.01); *A01J 5/041* (2013.01); *A01J 5/08* (2013.01)

(58) Field of Classification Search
CPC .................. A01J 5/08; A01J 5/41; A01J 5/44
USPC ............................................ 119/14.51, 14.54
See application file for complete search history.

(56) References Cited

U.S. PATENT DOCUMENTS

| | | | | |
|---|---|---|---|---|
| 2,099,884 A * | 11/1937 | Green | .................. | A01J 5/06 119/14.51 |
| 2,853,051 A | 9/1958 | Bauer | | |
| 3,079,891 A * | 3/1963 | Miller | .................. | A01J 5/044 119/14.5 |
| 4,745,881 A * | 5/1988 | Larson | .................. | A01J 5/08 119/14.51 |
| 5,493,995 A | 2/1996 | Chowdhury | | |
| 6,397,893 B1 * | 6/2002 | Johannesson | .......... | A01J 5/044 119/14.23 |
| 2004/0025794 A1 * | 2/2004 | Maier | ................. | A01J 5/044 119/14.51 |

(Continued)

FOREIGN PATENT DOCUMENTS

| | | |
|---|---|---|
| JP | H11291361 A | 10/1999 |
| WO | 2013/095291 A1 | 6/2013 |

OTHER PUBLICATIONS

Search Report for GB Application No. GB1611491.0, dated Nov. 22, 2016, 1 page.

(Continued)

*Primary Examiner* — Philip J Bonzell
*Assistant Examiner* — Tye William Abell
(74) *Attorney, Agent, or Firm* — Lowenstein Sandler LLP

(57) ABSTRACT

A conduit having a flexible tubular body having a first end connectable to a manifold or claw 14 and a free end connectable to a teatcup. Disposed partway along its length are disposed two integrally formed ribs capable of moving about an elbow joint. Each rib consists of two arms connected by an elbow joint about which the arms may move relative to one another. The arms of each rib are substantially planar and meet at a pivot point or elbow to form a substantially inverted V-shape when viewed along its the horizontal axis. The ribs encourage downward movement 5 in the vertical plane about its lateral axis at and away from the apex of each of the inverted V-shaped ribs whilst also resisting lateral movement or even upward movement.

5 Claims, 7 Drawing Sheets

(56) References Cited

U.S. PATENT DOCUMENTS

| | | | | |
|---|---|---|---|---|
| 2004/0060520 A1* | 4/2004 | Sellner | ..................... | A01J 5/04 119/14.54 |
| 2005/0223999 A1* | 10/2005 | Maier, Jr. | ................ | A01J 5/044 119/14.47 |
| 2008/0308043 A1* | 12/2008 | Hatzack | .................. | A01J 5/041 119/14.51 |
| 2010/0089325 A1* | 4/2010 | Auburger | ................ | A01J 5/044 119/14.18 |
| 2010/0180822 A1* | 7/2010 | Holmqvist | ............. | A01J 5/044 119/14.2 |

OTHER PUBLICATIONS

Search Report and Opinion for EP Application No. EP 16177897, dated Nov. 8, 2017, 6 pages.

* cited by examiner

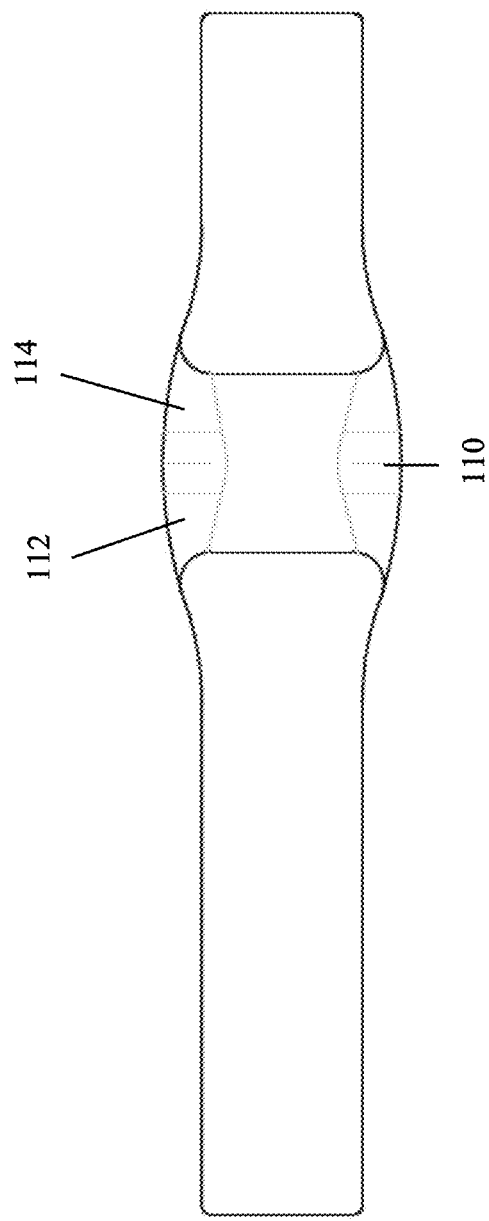

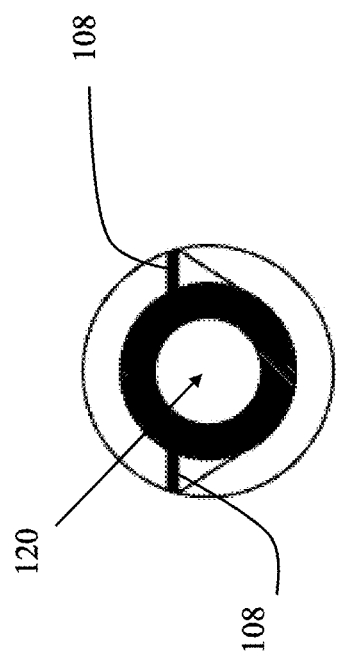

CONDUIT AND METHOD OF USING THE SAME

RELATED APPLICATIONS

This applications claims priority to and the benefit of GB Application number 1611491.0, titled CONDUIT AND METHOD OF USING THE SAME, filed 30 Jun. 2016 which is incorporated by reference herein.

TECHNICAL FIELD

Embodiments of the present invention relate to conduits, more particularly conduits for milking machines, and even more particularly to short milk tubes that provide a conduit between a manifold, commonly called a milking claw or clawpiece, and a teatcup liner and methods of using the same.

BACKGROUND

A milking machine comprises a vacuum source, a milk transport system and a series of lines and/or tubes connecting to the equipment attached to the teats of an animal to be milked.

In order to extract milk from an individual teat, a two chambered teatcup is attached by vacuum to the teat. In turn, a plurality of teatcups (usually two or four depending on the number of teats of the species being milked) is attached to a manifold (also known as a clawpiece), to facilitate ease of handling. The combination of multiple teatcups, connecting tubes and manifold is known as a milking cluster.

At the end of the milk flow period, the cluster is withdrawn from the teats of the animal being milked by a rope attached to an actuator device.

When an operator attaches the teatcups of a milking cluster to a milking animal, it is usual practice that the tube, connecting each teatcup to the clawpiece or manifold, should be folded over so as to close the lumen of the tube in order to limit the passage of air from atmosphere into the teatcup in order to limit or avoid vacuum loss and adverse effects on vacuum stability. As each individual cup is offered up to the teat in order to be sucked into position on the teat by means of the vacuum in the cup, the operator unbends the tube.

In large parlours with a high throughput of animals, one factor limiting to performance is the ease and speed with which an operator can take hold of the milking cluster and present the cluster to the teats of an animal in a manner that ensures that vacuum loss is minimised so that each teat when presented to the teatcup is sucked into position on the teat. In use, the teatcups of known devices can be in a variety of different orientations which increases the time it takes for an operator to gather the teatcups together to offer up the cups to an animal's teats and further, the milking tube may not be folded over to minimise vacuum loss and so the operator may be required to hold the cup over a teat for a longer period until sufficient vacuum has been restored for the teatcup to remain in situ and engage with a teat.

Advantageously, the embodiments of present invention overcome or alleviate one or more of the problems associated with the prior art.

SUMMARY OF EMBODIMENTS

In accordance with a first aspect of the present invention, there is provided a conduit for permitting the flow of fluid therethrough, said conduit comprising a flexible tubular body having a first end capable of connecting to a manifold in a predetermined orientation and a free end, said body having disposed between said ends biasing means for predetermining a fold point and the direction of displacement of the free end of flexible tubular body relative to the first end.

The biasing means may comprise at least one biasing arm extending along substantially the longitudinal axis of the conduit.

The biasing means may be advantageously hinged to predetermine the fold point.

The biasing means may comprise two substantially longitudinally extending ribs connected at an elbow.

The biasing means may bias movement of the free end of the conduit to bias movement in a vertical plane about its lateral axis.

The biasing means may bias movement downwardly away from the apex formed by the elbow.

The biasing means may resist torsional and/or lateral movement of the free end of the flexible tubular body at the predetermined fold point.

The biasing means may be integrally formed with the flexible tubular body. The flexible tubular body is advantageously moulded in a single piece using means known to the art.

In an embodiment, the biasing means may comprise a sleeve capable of extending substantially around a tube. In an embodiment, the sleeve extends around the entirety of the tube.

The flexible tubular body may be manufactured from any suitable material, such as rubber, synthetic rubber, silicone, plastics and/or thermoplastic elastomers.

The conduit may further comprise a stop for predetermining the extent to which the tubular body may fold at the predetermined fold point, in order to avoid excessive tear and/or shear force being applied to the tube in the folded position.

The conduit may be associated with a manifold.

One end of the flexible tubular body may be connectable with a manifold. The end connectable to a manifold may be adapted such that its orientation with respect to the manifold is fixed whilst the conduit's other end is free.

The free end of the conduit may be connectable to a teatcup or any other suitable adaptor.

In accordance with a further aspect of the present invention, there is provided a conduit for permitting the flow of fluid therethrough, said conduit comprising a flexible tubular body having a folded and an unfolded configuration wherein said conduit comprises biasing means for predetermining a fold point of the flexible tubular body at which point the conduit may fold.

The conduit may advantageously be a short milk tube.

In accordance with a further aspect of the present invention, there is provided a device for permitting the flow of fluid therethrough comprising a manifold and a plurality of conduits as described hereinabove.

In accordance with a further aspect of the present invention there is provided a short milk tube for providing a milk and air conduit between a teatcup and a milking claw, the short milk tube comprising a flexible tubular body having one end for attaching to a milking claw said end having means for determining the orientation in which the conduit connects to the milking claw in order to ensure that the orientation of the folded conduit respective to the milking claw is in the correct direction and a free end for attaching to a teatcup, wherein the short milk tube comprises biasing means for determining the fold point of the flexible tubular body and for determining the direction of displacement of the free end of the flexible tubular body.

The conduit may be an extension of the teatcup liner, or can be a separate component, connected to the teatcup liner by an appropriate adaptor.

In accordance with a further aspect of the present invention, there is provided a device for biasing the direction of bend of a flexible tubular conduit having a first end and a second end, said device extending at least substantially around the circumference of the tubular conduit and having biasing means for determining the fold point of the flexible tubular conduit and for determining the direction of displacement of the second end of the flexible tubular conduit relative to the first end.

Advantageously, the device extends around the circumference of the tubular conduit.

The biasing means may comprise any one or more of the features as described as hereinabove.

BRIEF DESCRIPTION OF THE DRAWINGS

Embodiments of the present invention will now be described by way of example only, in which:

FIGS. 3a to b show a conduit in accordance with the present invention;

FIG. 4 is a cross sectional view along the line A-A of a conduit in accordance with the present invention;

DETAILED DESCRIPTION

Figure 1:
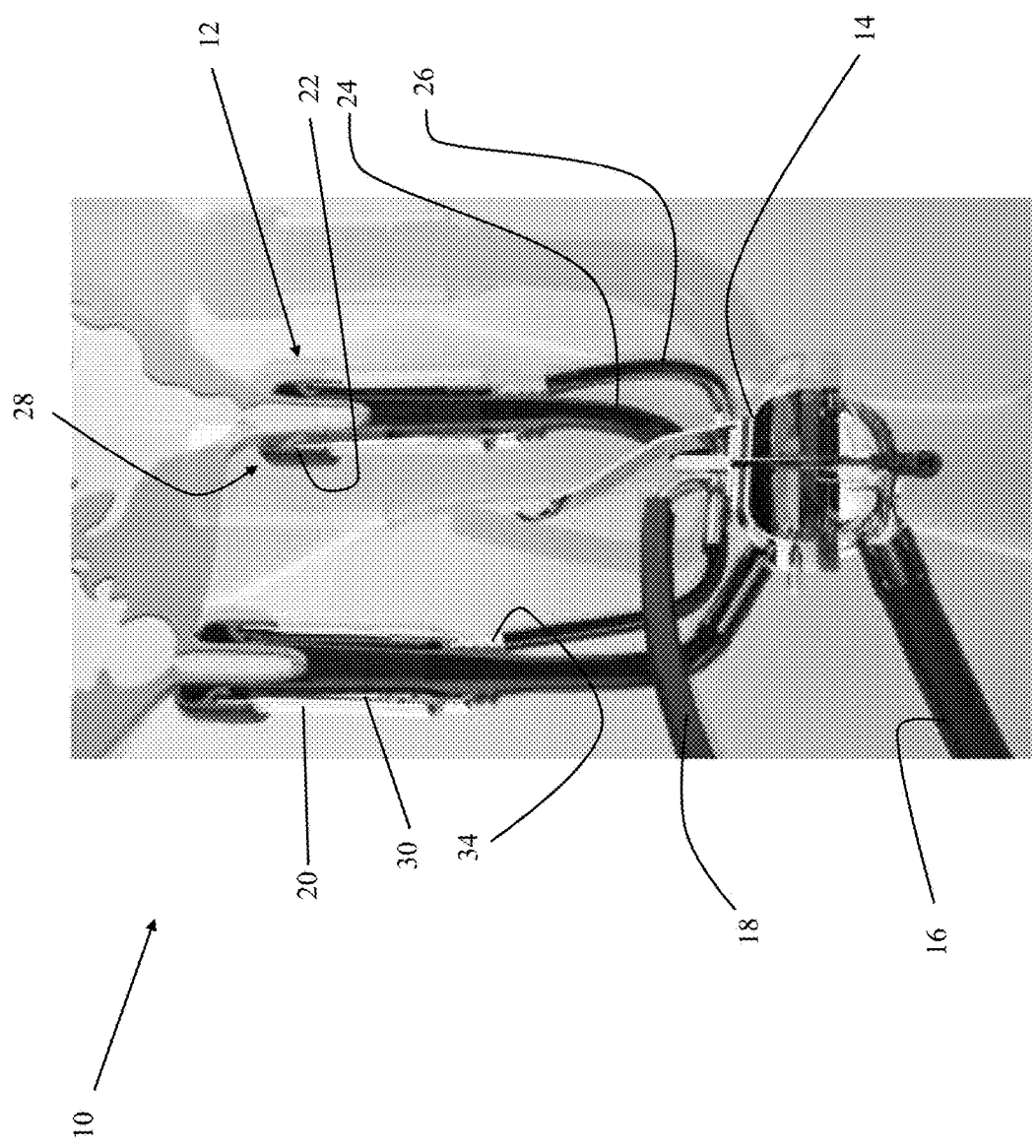
FIG. 1 shows a system known in the art.

As shown in FIG. 1, there is a system 10 having a cluster which attaches to the animal and which consists of a plurality of teatcup assemblies 12, a claw 14, a long milk tube 16 and long pulse tube(s) 18.

Each teatcup assembly 12 has a shell 20, a rubber liner 22 and a short milk tube 24 and short pulse tube 26.

Teatcup shells 20 may be made of stainless steel, plastics or a combination thereof. The liner 22 is a flexible sleeve, made of rubber, synthetic rubber, silicone, plastics and/or thermoplastic elastomers and having a mouthpiece 28. The liner sleeve may be round in cross section, or may incorporate two or more angles and when assembled in the shell 20 under tension, forms a space 30 (pulsation chamber) between the liner and shell. This pulsation chamber 30 is connected to the pulsator (not shown) through a nipple 34 on the side of the shell 20 via the claw 14. The teatcup assemblies 12 are connected by short milk 24 and short pulse tubes 26 to the claw 14, which is connected to the milking and pulsation vacuum (not shown) by a long milk tube 16 and long pulse tube(s) 18. The claw 14 has a small air admission hole (not shown), which admits air into the claw 14 to create pressure differential required to carry the milk away. The present invention has all of these features with the exception on the short milk tube which is replaced with a tube as set out in any one of the remaining figures.

Figure 2:
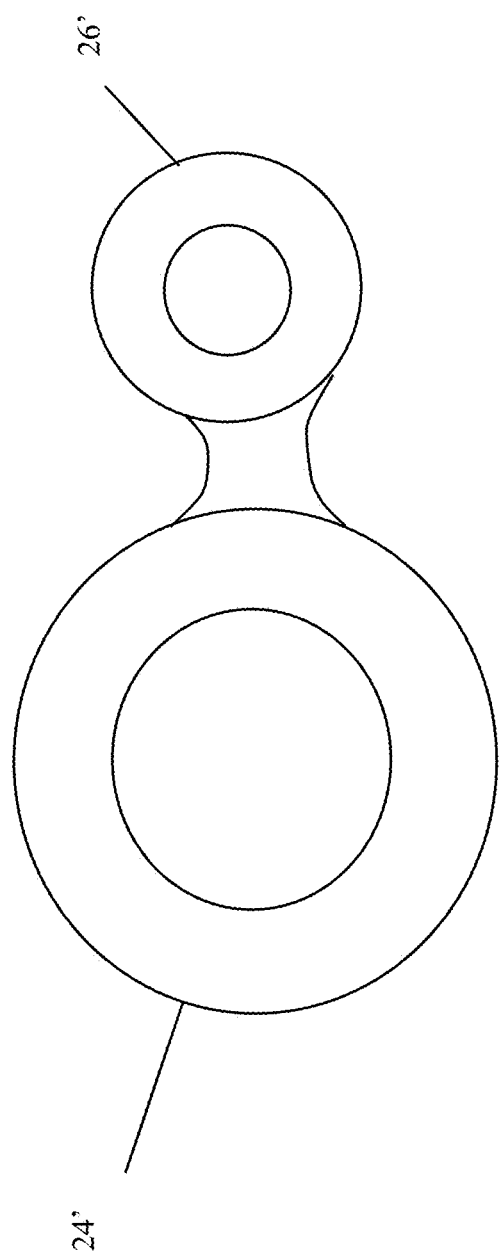
FIG. 2 shows a short pulse tube and a short milk tube in accordance with the present invention.

In an embodiment, the short pulse tube 26' and the short milk tube 24' may be moulded or extruded as a single piece twin bore component (as shown in FIG. 2).

Figure 6:
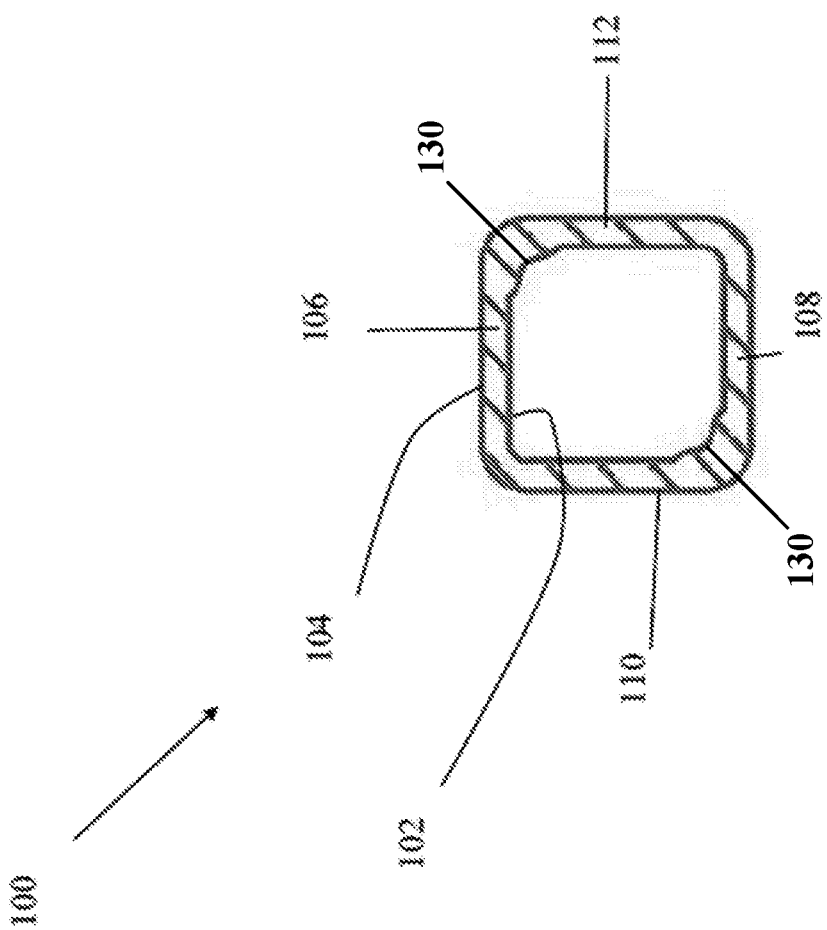
FIG. 6 shows the cross section of a conduit in accordance with the present invention at a first end.

The liner may, in an embodiment, have a cross section that incorporates two or more angles (see FIG. 6). The liner 100 has a through going bore defined by an inner surface 102, the conduit having substantially square section having an outer surface 104, an upper wall 106, a lower wall 108 and two side walls 110, 112. Located at two diametrically opposed corners on the inner surface 102 are locating members 130 each consisting of two ridges and one trough, which extend along the liner's length.

Figure 3A:
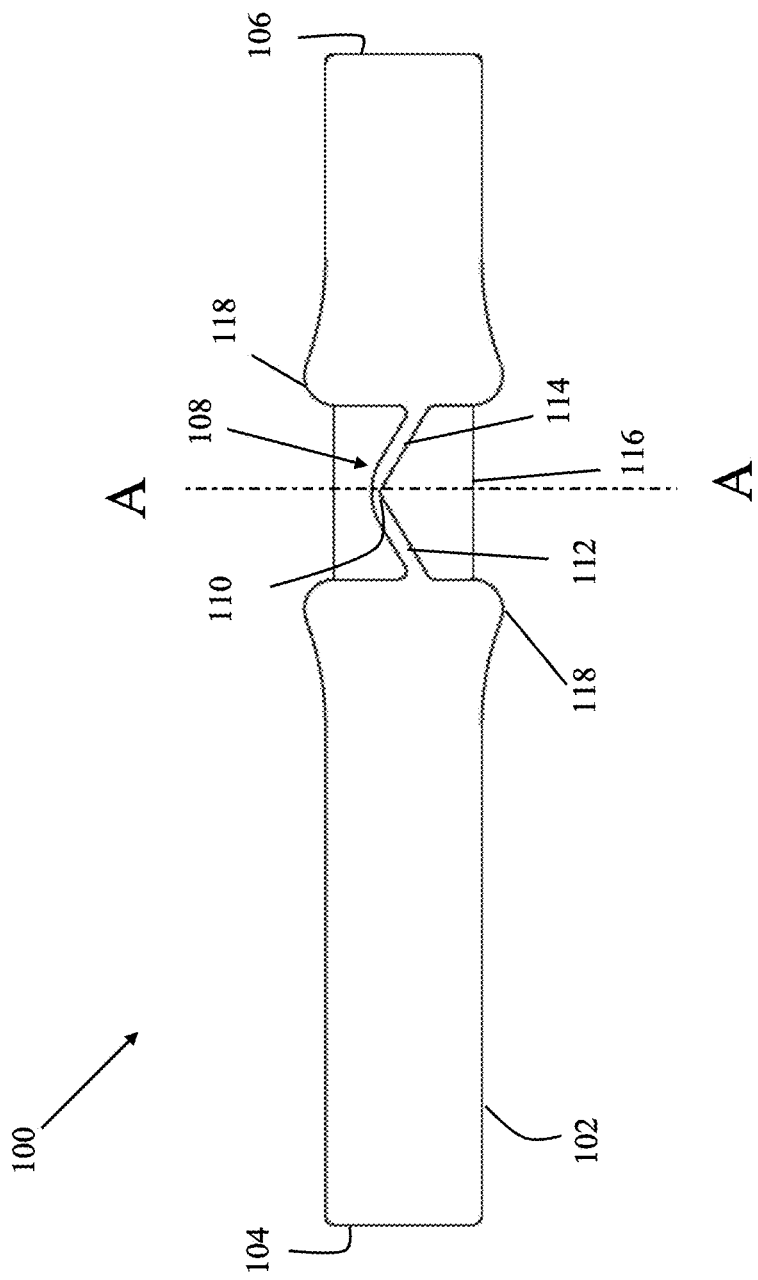

FIG. 3 shows a conduit 100 having a flexible tubular body 102 having a first end 106 connectable to a manifold or claw 14 and a free end 104 connectable to a teatcup. Disposed partway along its length are disposed two integrally formed ribs 108 capable of moving about an elbow joint 110. Each rib consists of two arms 112, 114 connected by an elbow joint 110 about which the arms may move relative to one another. The arms of each rib are substantially planar and meet at a pivot point or elbow to form a substantially inverted V-shape when viewed along its the horizontal axis. The ribs encourage downward movement in the vertical plane about its lateral axis at and away from the apex of each of the inverted V-shaped ribs whilst also resisting lateral movement or even upward movement.

Figure 5:
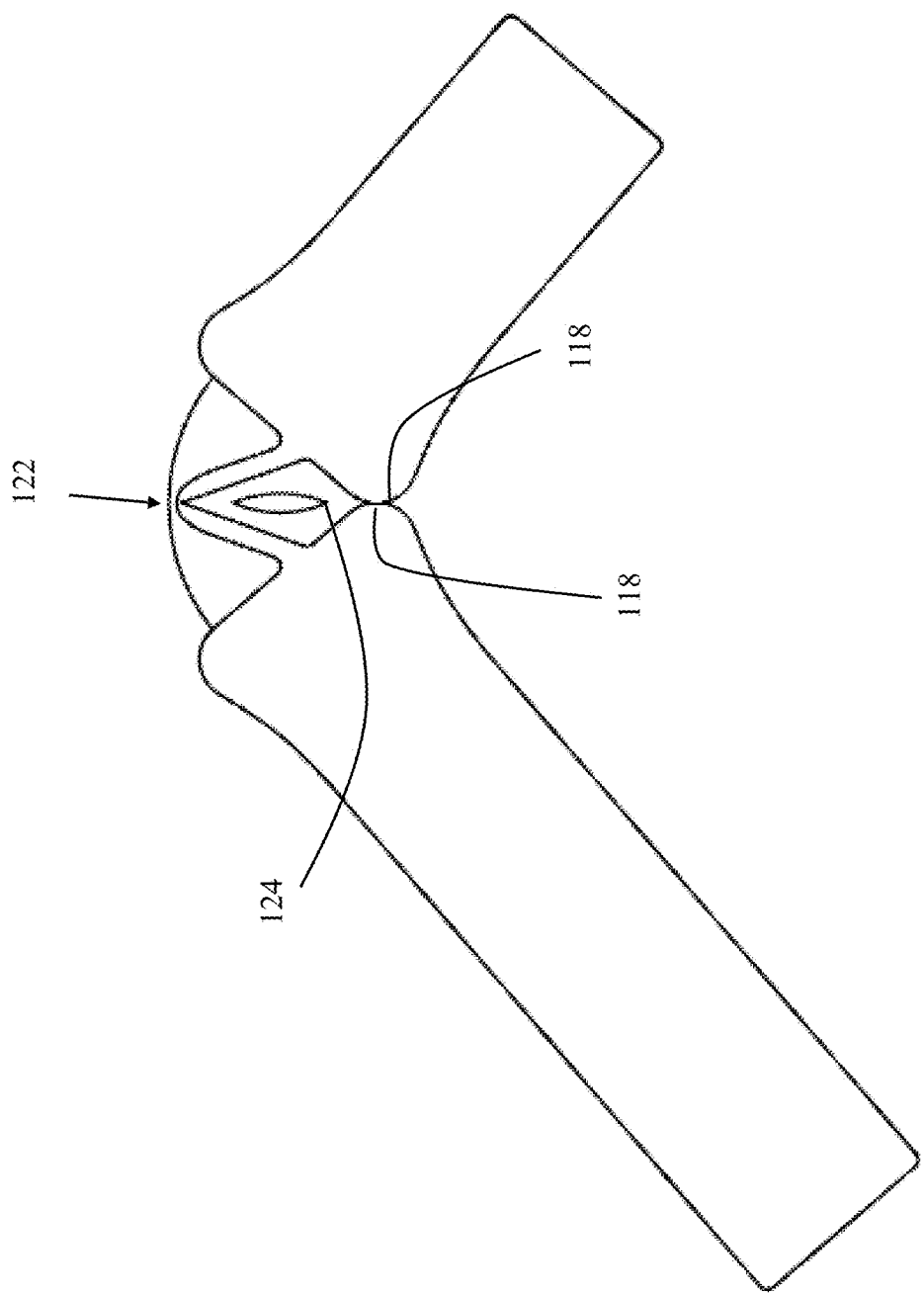
FIG. 5 shows a conduit in accordance with the present invention in a folded configuration.

The internal bore 120 (see FIG. 4) of the flexible tubular body is maintained along its entire length and there is a slight wastage 116 of the external diameter of the body at the fold point 122 where the ribs are disposed and a crease 124 is formed in the side wall. At either side of the wasted portion of the tubular body is a thickening 118 of the sidewall. The thickening of the sidewall is intended to act as a stop when in the folded configuration and when they abut one another, as shown in FIG. 5. This prevents the folded section of the tube from being overstretched which will prolong the life of the conduit. The crease 124 formed when in the folded configuration may lead to failure of the conduit over prolonged use and the presence of the stop effectively formed by the thickenings of the sidewalls when they come into contact with one another prevents free end from folding further leading to increased wear at the crease.

Thus the teatcup will tend to repeatedly fall in same predetermined direction when the cluster is withdrawn from udder and/or park position associated with the cleaning/disinfecting device, commonly known as a jetter. Thus there is no need for mechanical help/supporting device, other than the natural weight of the operational head saving time and cost associated with the system and method known to the art.

The form of the tube is designed in such a manner as to avoid over bending.

The tube may comprise means for determining the orientation of its mounting to a manifold. The means for determining the orientation may comprise a locating strip and/or tab either on the liner or on the entry nipple to the manifold, and/or in the form of the end of the conduit being moulded in a specific shape which can only be inserted in one precise orientation into an orifice on the manifold.

What is claimed is:

1. A short milk tube to provide a milk and air conduit between a teatcup and a manifold, the short milk tube comprising:

a flexible tubular body movable between a folded position and an unfolded position, the flexible tubular body having a first end to attach to the manifold, the first end having a locating member to determine an orientation in which the body connects to the manifold, and a free end to attach to the teatcup; and a biasing component, wherein the biasing component comprises a first biasing arm and a second biasing arm extending along a longitudinal axis of the flexible tubular body when in the unfolded position, wherein the first biasing arm and the second biasing arm are connected to one another at an angle forming an elbow joint when the flexible tubular body is in the unfolded position, the elbow joint to determine a fold point of the flexible tubular body and to determine a direction of displacement of the free end of the flexible tubular body to bias movement of the free end away from an apex formed by the elbow joint when the flexible tubular body is moved to the folded position.

2. The short milk tube of claim 1, wherein the flexible tubular body is an extension of a teatcup liner, or is a separate component, connected to the teatcup liner.

3. A device comprising:
   a manifold;
   a plurality of conduits coupled to the manifold, each of the plurality of conduits comprising a flexible tubular body having a folded and an unfolded configuration; and
   a biasing component, wherein the biasing component comprises a first biasing arm and a second biasing arm extending along a longitudinal axis of the flexible tubular body when in the unfolded configuration, wherein the first biasing arm and the second biasing arm are connected to one another at an angle forming an elbow joint when the flexible tubular body is in the unfolded configuration, the elbow joint to determine a fold point of the flexible tubular body and to determine a direction of displacement of a free end of the flexible tubular body to bias movement of the free end away from an apex formed by the elbow joint when the flexible tubular body is moved to the folded configuration.

4. The device of claim 3, wherein the plurality of conduits comprises a plurality of short milk tubes.

5. The device of claim 3, wherein the flexible tubular body has a first end connectable to the manifold.

* * * * *